United States Patent [19]

McCracken et al.

[11] Patent Number: 4,823,053

[45] Date of Patent: Apr. 18, 1989

[54] CONTROL OF VIBRATION ENERGIZATION

[75] Inventors: William McCracken, Elderslie; Alexander J. Waddell, Denny, both of Scotland

[73] Assignee: National Research Development Corporation, London, England

[21] Appl. No.: 105,956

[22] Filed: Oct. 7, 1987

Related U.S. Application Data

[63] Continuation of Ser. No. 908,008, Sep. 16, 1986, abandoned.

[30] Foreign Application Priority Data

Sep. 16, 1985 [GB] United Kingdom ................. 8522819

[51] Int. Cl.[4] ............................................ H02K 33/00

[52] U.S. Cl. .................................... 318/132; 318/118; 318/114

[58] Field of Search ................. 318/114, 118, 127–132

[56] References Cited

U.S. PATENT DOCUMENTS

| | | | |
|---|---|---|---|
| 2,917,691 | 12/1959 | DePrisco et al. | 318/118 |
| 3,697,837 | 10/1972 | Vinbaugh | 318/128 |
| 4,049,997 | 9/1977 | McGhee | 318/132 X |
| 4,177,434 | 12/1979 | Ida | 318/132 X |
| 4,180,766 | 12/1979 | Matula | 318/132 X |
| 4,331,263 | 5/1982 | Brown | 318/132 X |

FOREIGN PATENT DOCUMENTS 2008809 6/1979 United Kingdom .

OTHER PUBLICATIONS

WO86/02058, Apr. 10, 1986—PCT/EP85/00479, filed Sep. 17, 1985, Pross, Bruno et al.

Electronic and Radio Engineering—Frederick Emmons Terman, McGraw-Hill Book Company, Inc. 1955.

RCA—Digital Integrated Circuits—Monolithic Silicon CD4046A Types COS/MOS Micropower Phase--Locked Loop—pp. 1-10.

Investigation and Application of a Conyrol Circuit to Maintain Resonance in a Forced Vibration System by B. J. Hooper, pp. 1-76.

RS Components Jul.-Oct. 1983, pp. 243-245.

Stock Catalogue 1978/79 pg 112.

RS Components Jul.-Oct. 1983, p. 239.

*Primary Examiner*—Mark O. Budd

*Attorney, Agent, or Firm*—Cushman, Darby & Cushman

[57] ABSTRACT

An arrangement to controllably vibrate a resiliently supported body including electromagnetic drive means energizable to vibrate the body, means to control the device means, means to detect the actual vibration of the body, the control means including digital signal processing means to produce a control pulse train representing a required phased difference from the detected vibration to control the energization of the drive means with an independently set phase difference from the detected frequency to sustain the vibration of the body.

6 Claims, 1 Drawing Sheet

CONTROL OF VIBRATION ENERGIZATION

This is a continuation of application Ser. No. 908,008, filed Sept. 16, 1986, which was abandoned upon the filing hereof.

This invention relates to the vibration of a body and to the control of the energisation to bring about such vibration.

Hitherto arrangements to cause a body to vibrate, for example in the mechanical handling art of vibratory conveyors or hopper shakers, have used simple single frequency actuators or eccentrically rotated weights linked to the body. More recently, adjustable frequency actuators or springs sub-resonantly driven at steady speed by adjustable power motors have been used. Such arrangements have varying degrees of efficiency, precision and reliability.

It is an object of the present invention to improve the efficiency, precision and reliability of the vibration of a body.

According to the invention there is provided an arrangement to controllably vibrate a resiliently supported body including electromagnetic drive means energisable to vibrate the body, means to control the drive means, means to detect the actual vibration of the body, the control means including digital signal processing means to produce a control pulse train representing a required phase difference from the detected vibration to control the energisation of the drive means with an independently set phase difference from the detected frequency to sustain the vibration of the body.

Conveniently the actual vibration is tracked by a digital phase locked loop integrated circuit and the controlled frequency to drive the body is generated by the oscillator in the phase locked loop, which may be of the edge-controlled type.

Conveniently the arrangement includes means to control the amplitude of the energisation of the drive means. The drive means may include electromagnetic actuators to vibrate the body.

According to another aspect of the invention there is provided a method of controllably vibrating a resiliently supported body vibratable by electromagnetic drive means including:

energising the drive means to vibrate the body, detecting the actual vibration of the body, controlling the energisation of the drive means to a required phase difference from the detected vibration, producing a phase difference control for the energisation of the drive means with phase difference measured and set independently of the detected frequency, maintaining the actual vibration at a set phase angle.

Figure 1:
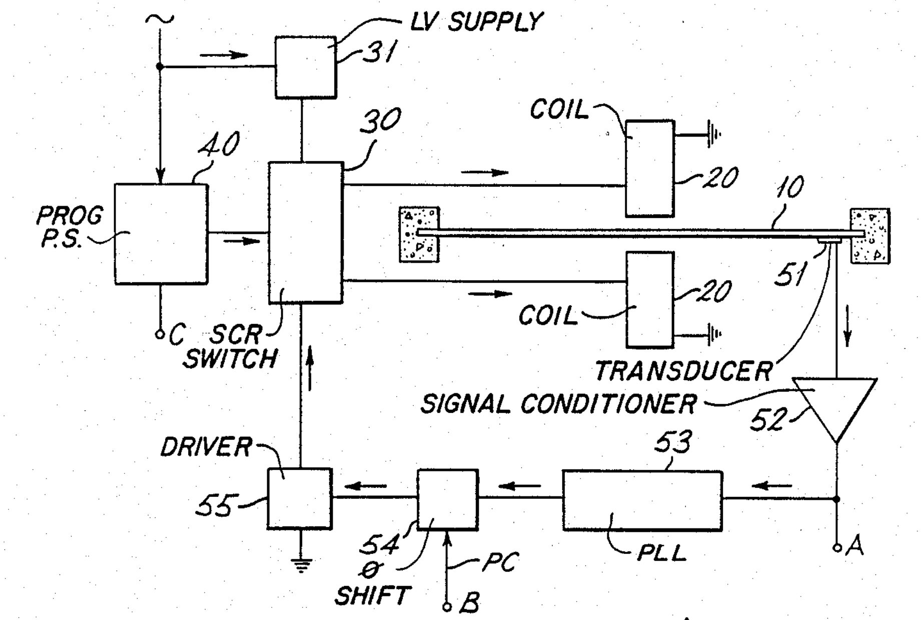
Figure 2:
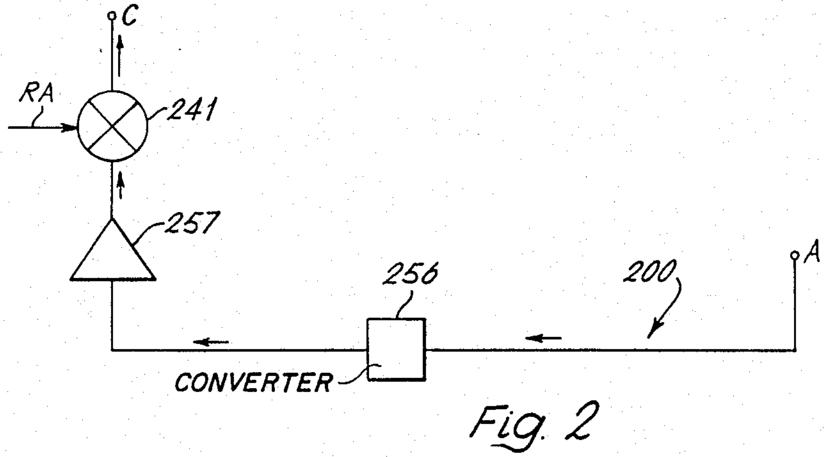
Figure 3:
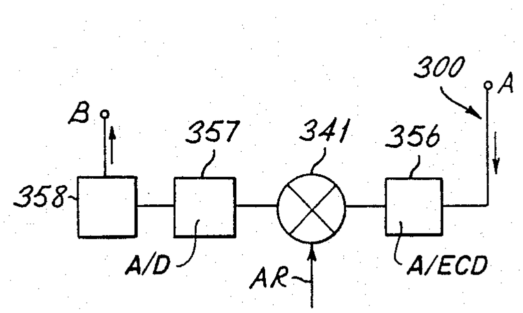

Embodiments of the invention will now be described with reference to the accompanying drawings in which:

FIG. 1 is a block schematic circuit diagram of an arrangement to control the vibration of a body, and FIGS. 2 and 3 show modifications of the circuit of FIG. 1.

A problem with devices that have the ability to vibrate is that the amplitude of vibration for a given amount of energisation depends how close the frequency at which vibration occurs is to the resonant frequency of the device. When the frequency at which the device vibrates approaches resonance, the amplitude for a given energisation can increase very rapidly, particularly if the device has a significant value of the quantity known as "Q", sometimes called the magnification factor, in electrical circuits. Such an increase can be dangerous as the stress on the device increases and then destructive "run-away" can occur. This is a real possibility when a device is vibrated near to the resonant frequency with a changing load. If the frequency of energisation corresponds with the resonant frequency of the device with a particular load, an excessive amplitude can occur.

On the other hand, to achieve efficient use of energisation energy, it is desirable to operate the device as close as possible to resonance. In some cases constant amplitude of vibration over a range of frequencies is required, in others a constant frequency of vibration at varying amplitude and in others again constant amplitude and frequency.

In principle constant conditions can be achieved by precise matching of the energisation frequency to the instantaneous natural frequency of the device and the load thereon. From the "Universal resonance curve" (see e.g. Terman, Electronic and Radio Engineering, McGraw Hill 1955 p48) a particular phase angle corresponds to a particular relative response, i.e. fraction of resonance amplitude, for a specific condition of the vibrating device (load, temperature etc.) so the amplitude of vibration should be constant at constant phase angle between the natural and energisation frequencies.

UKPS No. 2008809B discusses this problem and suggests that constant amplitude at varying load can be achieved by examining the phase-relationship of the applied and actual vibrations and attempting to keep this constant. If the amplitude is to be held constant even if the measured phase relationship does not change then the actual amplitude is measured and any change used to generate a control signal to alter the applied frequency and therefore phase relationship to restore the required amplitude.

However it is necessary to be able to measure the phase difference of the applied and actual vibrations and in practice the phase locked loop operating on analog principles does not produce a phase difference signal which is independent of the frequency at which the loop operates. Careful "tuning" of a system based on an analog loop of the 565 type reduced the error to ±3° on a nominal 90° phase difference for a ±40% change in the input frequency to the phase locked loop about the nominal value of 50 Hz. This is not precise enough for proper control of the forced vibration arrangement although it may be adequate for some purposes. A thesis by Brian J. Hopper of the University of Strathclyde, Glasgow, Scotland, "Investigation and application of a control circuit to maintain resonance in a forced vibration system" June 1983, reports the detailed investigation of the analog loop and reveals this inherent defect of the analog system.

Referring to FIG. 1 a beam 10, the body to be vibrated, is encased at both ends, that is embedded in respective supports. The supports are secured to a solid base.

Drive coils 20 are positioned one each side of the beam. The coils are wound on soft iron cores. The coils on each side of the beam can be energised in turn via a semiconductor controlled rectifier switch 30. In this way the beam 10 can be deflected first one way and then the other, to thereby be driven into vibration. The control of the switch is clearly very important and is described below. The power to energise the coils is from a suitable programmable power supply 40, adjustable having regard to the drive power needed. Auxiliary power for switch 30, e.g. for commutation, is available from a low voltage supply 31. The actual frequency of vibration of the body, i.e. beam 10 in this example, is detected by a suitable transducer 51. The output signal from the transducer is made suitable for the control loop by a signal conditioning unit 52. A suitable transducer is a VERNITRON (R.T.M.) p.z.t. device type PG1 and a suitable conditioning unit is a CA3140. This may include an amplifier and other devices and controls as appropriate. The conditioned signal from unit 52 is applied to the input of a phase locked loop 53. This can be a suitable conventional integrated circuit device but arranged to work at the low frequencies (tens of Hertz) involved, however, as explained above, the application of a phase locked loop to control a vibrator is not straightforward.

When an analogue phase locked loop is used, such as the widely-known "565" type or an equivalent discrete component arrangement, the phase relationship between the actual vibration and the energisation is not independent of the frequency of operation, the phase changing as the frequency of operation moves away from the free running frequency of the phase locked loop configuration.

It has been found, and established after extensive experiment, that a phase locked loop operating on digital principles, such as a "4046", does permit the phase control to be independent of frequency over an extensive range (0.2 Hz to 2 KHz).

Accordingly phase locked loop 53 is a phase locked loop operating on digital principles, such as the type 4046, which provides an output representing the frequency at which the beam is to be energised and a phase angle which acts as a reference position.

Specifically a type CD4046A manufactured by R.C.A. and described in File Number 637 dated USA/3-76 has been used. Reference is directed to this for connection and operation information. The output of the phase locked loop is applied to a phase shifter 54 so that the required phase offset can be included. It should be noted that phase comparator II of the 4046 integrated circuit is used. This edge-controlled digital memory network comparator provides the independence of phase and frequency which the other comparator in the 4046 does not provide.

The output of the phase shifter is applied to a driver circuit 55 which operates the S.C.R. switch 30 mentioned above to energise the coils 20 at the required frequency and phase. The control signal PC applied to the phase shifter 54 adjusts the phase of the excitation so moving the operating point of the arrangement on the flanks of the resonance curve, on either side of the peak. In this way the vibratory amplitude can be controlled at a set level of drive power.

Referring now to FIG. 2, an additional circuit to modify that of FIG. 1 in another embodiment of the invention is shown. This allows the amplitude to be controlled in a control loop 200 connected between points A and C of FIG. 1. Loop 200 uses the output of the transducer 51 and amplifier 52, converting this to an amplitude signal in converter 256, amplifying the output signal of converter 256 at 257 and comparing this with a reference amplitude signal RA in a controller such as 241. The output from controller 241 is applied to programmable power supply 40 so controlling the level of power to the switch 30. The phase shifter 54 can be set to zero, removed or used as described for FIG. 1, but this of course is more wasteful of energy as the arrangement is not operating at peak efficiency at the top of the resonance curve.

As the phase offset is determined by a digital device, great precision and fineness of control is possible so that the operating point of the vibrating system can be moved around on the resonance peak of vibration, generally in the range of ±90° around the peak. Other ranges of control are of course possible. For example only a selected part of the range, even on one flank only, or a wider range is possible. Also the response time of the loop can be controlled, by the choice of external registers and capacitors for the "4046" device, over a wide range from milliseconds to tens of seconds.

Referring now to FIG. 3, another modification of FIG. 1 embodying the invention is shown. The elements shown in FIG. 3 are connected between points A and B of FIG. 1 to augment the control loop.

However, only a fixed power supply only is needed in this embodiment, instead of programmable supply 40, as phase offset and hence amplitude are controlled through the phase shifter 54. The control loop 300 of converter 356, comparator 341 and converters 357 (analog to digital) and 358 (binary coded decimal) is responsive to the actual amplitude of vibration, represented by the output of unit 52, and a desired amplitude reference signal, AR, to generate a binary coded decimal control signal for phase shifter 54. Otherwise the circuit operates in a similar manner to that of FIG. 1.

The circuits described above refine the control of the vibration of a resiliently supported body, such as a conveyor or similar device, so that the operating point can be controlled in a range of a few degrees about or near to the resonance peak with the phase offset being controllable independently of frequency whereas hitherto phase offset and frequency were interdependent and not, in any case, controllable with such precision. The range may be a few degrees only of phase of a larger range and can be around the peak or on the flank of the resonance curve. This greatly improves the efficiency of energisation. Although described in terms of a specific phase locked loop the invention is not restricted to this specific device. What is required is a loop that will perform with independence of phase and frequency.

We claim:

1. A device for controlling vibration of a resiliently supported body, comprising:

electromagnetic drive means for vibrating said body, when energized;

means for detecting actual vibration of the body;

control means for controlling said drive means, including digital signal processing means for producing a control pulse train which represents a phase difference between said detected vibration and a desired vibration, and controlling energization of the drive means with an independently set phase difference from the detected frequency to sustain the vibration of the body.

2. An arrangement according to claim 1 wherein said detecting means includes a digital phase locked loop integrated circuit including an ascillator producing a controlled frequency, said controlled frequency coupled to said electromagnetic drive means to drive the body.

3. An arrangement according to claim 2 in which the phase locked loop includes an edge-controlled digital memory network phase comparator.

4. An arrangement according to claim 1 further comprising means for controlling an amplitude of the energisation of the drive means.

5. An arrangement according to claim 1 in which the drive means includes electromagnetic actuators to vibrate the body.

6. A method of controllably vibrating a resiliently supported body vibratable by electromagnetic drive means, comprising the steps of:

energising the drive means to vibrate the body, detecting an actual vibration of the body, controlling the energisation of the drive means to a required phase difference from the detected vibration, producing a pulse train as a phase difference control for the energisation of the drive means with phase difference measured and set independently of the detected frequency, and maintaining said actual vibration at a set phase angle.

* * * * *